US010360481B2

(12) United States Patent
Gopalan (10) Patent No.: US 10,360,481 B2
(45) Date of Patent: Jul. 23, 2019

(54) UNCONSTRAINED EVENT MONITORING VIA A NETWORK OF DRONES

(71) Applicant: AT&T Intellectual Property I, L.P., Atlanta, GA (US)

(72) Inventor: Raghuraman Gopalan, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 120 days.

(21) Appl. No.: 15/598,562

(22) Filed: May 18, 2017

(65) Prior Publication Data

US 2018/0336440 A1     Nov. 22, 2018

(51) Int. Cl.
| | | |
|---|---|---|
| *G06K 9/00* | (2006.01) | |
| *G06K 9/66* | (2006.01) | |
| *G06N 3/08* | (2006.01) | |
| *H04N 7/18* | (2006.01) | |
| *B64C 39/02* | (2006.01) | |
| *B64D 47/08* | (2006.01) | |

(52) U.S. Cl.
CPC ............. *G06K 9/66* (2013.01); *B64C 39/024* (2013.01); *B64D 47/08* (2013.01); *G06K 9/00718* (2013.01); *G06N 3/088* (2013.01); *H04N 7/181* (2013.01); *H04N 7/185* (2013.01); *B64C 2201/127* (2013.01)

(58) Field of Classification Search
CPC ............ B64C 39/024; B64C 2201/127; B64C 2201/146; B64C 2201/123; B64C 2201/145; G05D 1/0094; G05D 1/0027; G05D 1/101; G05D 1/0038; G05D 1/0088; G01C 11/02; G06T 2207/10021; G06T 7/70; G08B 13/1965; H04N 2013/0081; H04N 2013/0085
See application file for complete search history.

(56) References Cited

U.S. PATENT DOCUMENTS

| | | | |
|---|---|---|---|
| 8,315,794 B1 | 11/2012 | Strelow et al. | |
| 9,162,753 B1 | 10/2015 | Panto et al. | |
| 9,429,945 B2 | 8/2016 | Pulleti et al. | |
| 2016/0019458 A1* | 1/2016 | Kaufhold | ............... G01S 7/417 342/25 F |
| 2016/0055883 A1 | 2/2016 | Soll et al. | |
| 2016/0070260 A1 | 3/2016 | Levien et al. | |

(Continued)

FOREIGN PATENT DOCUMENTS

| | | |
|---|---|---|
| CN | 205139709 U | 4/2016 |
| EP | 2175661 A1 | 4/2010 |

*Primary Examiner* — Li Liu
(74) *Attorney, Agent, or Firm* — Haynes and Boone, LLP (57) ABSTRACT

In one example, the present disclosure describes a device, computer-readable medium, and method for performing event monitoring in an unconstrained manner using a network of drones. For instance, in one example, a first video and a second video are obtained. The first video is captured by a first drone monitoring a first field of view of a scene, while the second video is captured by a second drone monitoring a second field of view of the scene. Both the first video and the second video are unlabeled. A deep learning technique is applied to the first video and the second video to learn a model of the scene. The model identifies a baseline for the scene, and the deep learning technique is unsupervised. The model is stored.

20 Claims, 4 Drawing Sheets

(56) References Cited

U.S. PATENT DOCUMENTS

| | | | |
|---|---|---|---|
| 2016/0078759 A1* | 3/2016 | Nerayoff | G06Q 20/145 |
| | | | 701/3 |
| 2016/0286135 A1 | 9/2016 | Baseuny | |
| 2016/0350599 A1* | 12/2016 | Bataller | G06T 7/80 |
| 2017/0039424 A1 | 2/2017 | Nerayoff et al. | |
| 2017/0053169 A1* | 2/2017 | Cuban | H04N 7/185 |
| 2017/0084032 A1 | 3/2017 | Zeng et al. | |
| 2017/0090271 A1 | 3/2017 | Harris et al. | |
| 2017/0195627 A1* | 7/2017 | Sham | B64C 39/024 |
| 2017/0336203 A1* | 11/2017 | Barnes | G01S 17/88 |
| 2018/0053139 A1* | 2/2018 | Stoman | G06Q 10/083 |
| 2018/0093781 A1* | 4/2018 | Mallinson | B64F 1/04 |
| 2018/0184073 A1* | 6/2018 | Burgess | B64C 39/024 |
| 2018/0210465 A1* | 7/2018 | Qu | G06T 7/74 |
| 2018/0213208 A1* | 7/2018 | Guo | H04N 13/144 |
| 2018/0247421 A1* | 8/2018 | DeAngelis | G06T 7/292 |

* cited by examiner

UNCONSTRAINED EVENT MONITORING VIA A NETWORK OF DRONES

The present disclosure relates generally to computer vision, and relates more particularly to devices, non-transitory computer-readable media, and methods for performing event monitoring in an unsupervised manner using a network of drones.

BACKGROUND

Drones are unmanned aerial vehicles (UAVs) that may be remotely controlled or may be flown autonomously (e.g., using computer vision processes). Although previously used largely in a military context, in recent years, civilian use of drones has become more widespread. For instance, drones are often used to capture video for the purposes of surveillance, traffic and weather monitoring, personalization, biometrics, and the like.

SUMMARY

In one example, the present disclosure describes a device, computer-readable medium, and method for performing event monitoring in an unconstrained manner using a network of drones. For instance, in one example, a first video and a second video are obtained. The first video is captured by a first drone monitoring a first field of view of a scene, while the second video is captured by a second drone monitoring a second field of view of the scene. Both the first video and the second video are unlabeled. A deep learning technique is applied to the first video and the second video to learn a model of the scene. The model identifies a baseline for the scene, and the deep learning technique is unsupervised. The model is stored.

In another example, a device includes a processor and a computer-readable medium storing instructions which, when executed by the processor, cause the processor to perform operations. The operations include obtaining a first video that is captured by a first drone monitoring a first field of view of a scene, wherein the first video is unlabeled, obtaining a second video that is captured by a second drone monitoring a second field of view of the scene, wherein the second video is unlabeled, applying a deep learning technique to learn a model of the scene, wherein the model identifies a baseline for the scene, and wherein the deep learning technique is unsupervised, and storing the model.

In another example, a non-transitory computer-readable storage medium stores instructions which, when executed by a processor, cause the processor to perform operations. The operations include obtaining a first video that is captured by a first drone monitoring a first field of view of a scene, wherein the first video is unlabeled, obtaining a second video that is captured by a second drone monitoring a second field of view of the scene, wherein the second video is unlabeled, applying a deep learning technique to learn a model of the scene, wherein the model identifies a baseline for the scene, and wherein the deep learning technique is unsupervised, and storing the model.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure performs event monitoring in an unconstrained manner using a network of drones. As discussed above, drones are often used to capture video for the purposes of surveillance, traffic and weather monitoring, personalization, biometrics, and the like. However, certain unique aspects of drone-captured video, such as variable altitude and other spatial idiosyncrasies, can make it challenging to reliably monitor large scenes using multiple drones. For instance, most event monitoring algorithms assume the use of either ground plane or aerial videos, and do not easily correlate between the ground plane and the air or account for the planes in between.

Examples of the present disclosure provide a way of performing event monitoring in an unconstrained manner using a network of drones. Each drone in the network is capable of capturing video of a scene in any plane ranging from the ground plane to the air. In one example, deep learning algorithms are used to extract features from a plurality of drone captured videos (captured by a plurality of drones) and to establish correspondences between those features, without human intervention.

Within the context of the present disclosure, an "event" could be anything that happens within a monitored scene (e.g., a building or complex of buildings, a street, or a city). Different applications may be configured to detect different types of events. For instance, an event could be a human engaged in a suspicious activity, an observed vehicle pattern, or, more broadly, two or more items that are determined to be connected in some way. Once detected, an event could be subjected to further analysis in order to determine whether action should be taken to address the event. For instance, the further analysis could include facial recognition, pedestrian detection, vehicle identification (e.g., make and model), activity analysis (e.g., running, walking, chasing, etc.), and/or crowd pattern analysis.

Figure 1:
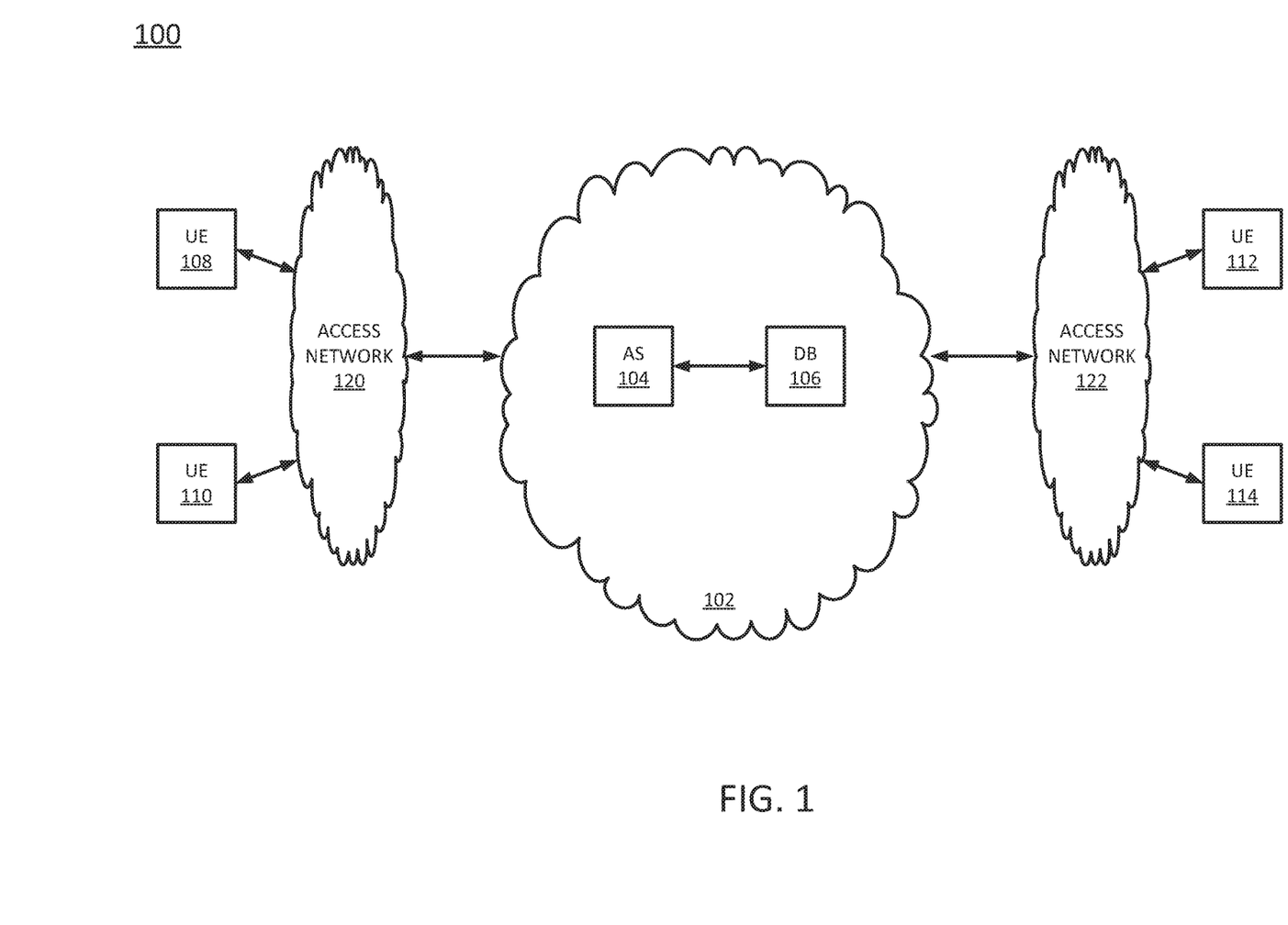
FIG. 1 illustrates an example network related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include an application server (AS) 104 and a database (DB) 106. Although only a single AS 104 and a single DB 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114.

In one example, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In one example, at least some of the UEs 108, 110, 112, and 114 are drones equipped with video cameras. In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed.

Figure 4:
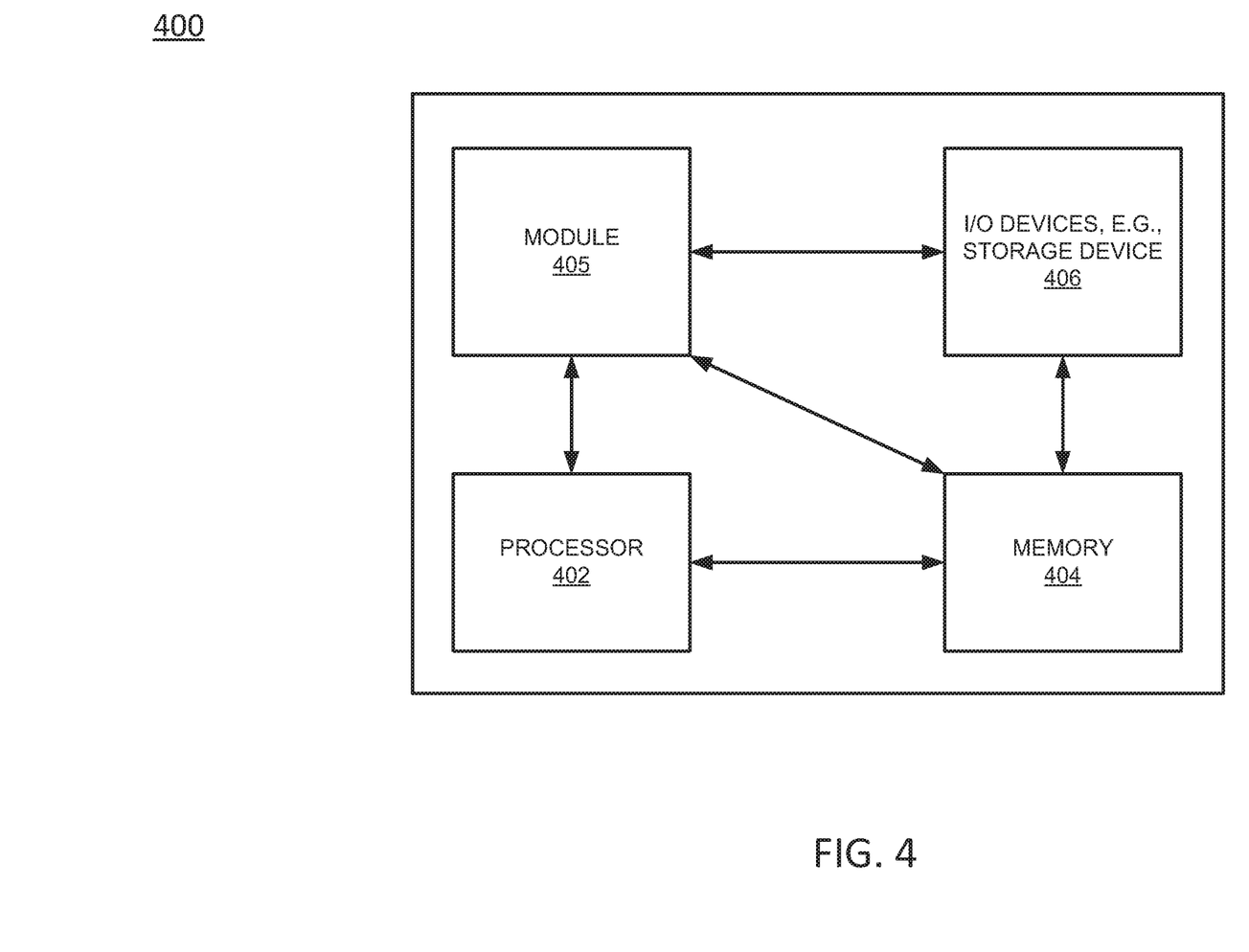
FIG. 4 depicts a high-level block diagram of a computing device specifically programmed to perform the functions described herein.

The AS 104 may comprise a general purpose computer as illustrated in FIG. 4 and discussed below. In one example, the AS 104 may perform the methods discussed below related to event monitoring. For instance, in one example, the AS 104 hosts an application that communicates with one or more of the UEs 108, 110, 112, and 114. As an example, the application may be a surveillance application, or a traffic or weather monitoring application, that subscribes to the output (e.g., video stream) of one or more of the UEs 108, 110, 112, and 114. In particular, the AS 104 may receive videos recorded by the UEs 108, 110, 112, and 114 and may analyze the videos to detect events of interest in a scene. The AS 104 may further send signals to the UEs 108, 110, 112, and 114 instructing the UEs to adjust their orientations.

In one example, the DB 106 may store videos recorded by one or more of the UEs 108, 110, 112, or 114, e.g., by one or more drones. These videos may include videos that depict actors or components (e.g., humans, cars, objects) engaged in various activities or action patterns (e.g., walking, running, group patterns, etc.). These videos may be used to train the AS 104 to infer when an event meriting further analysis is depicted in a new video.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
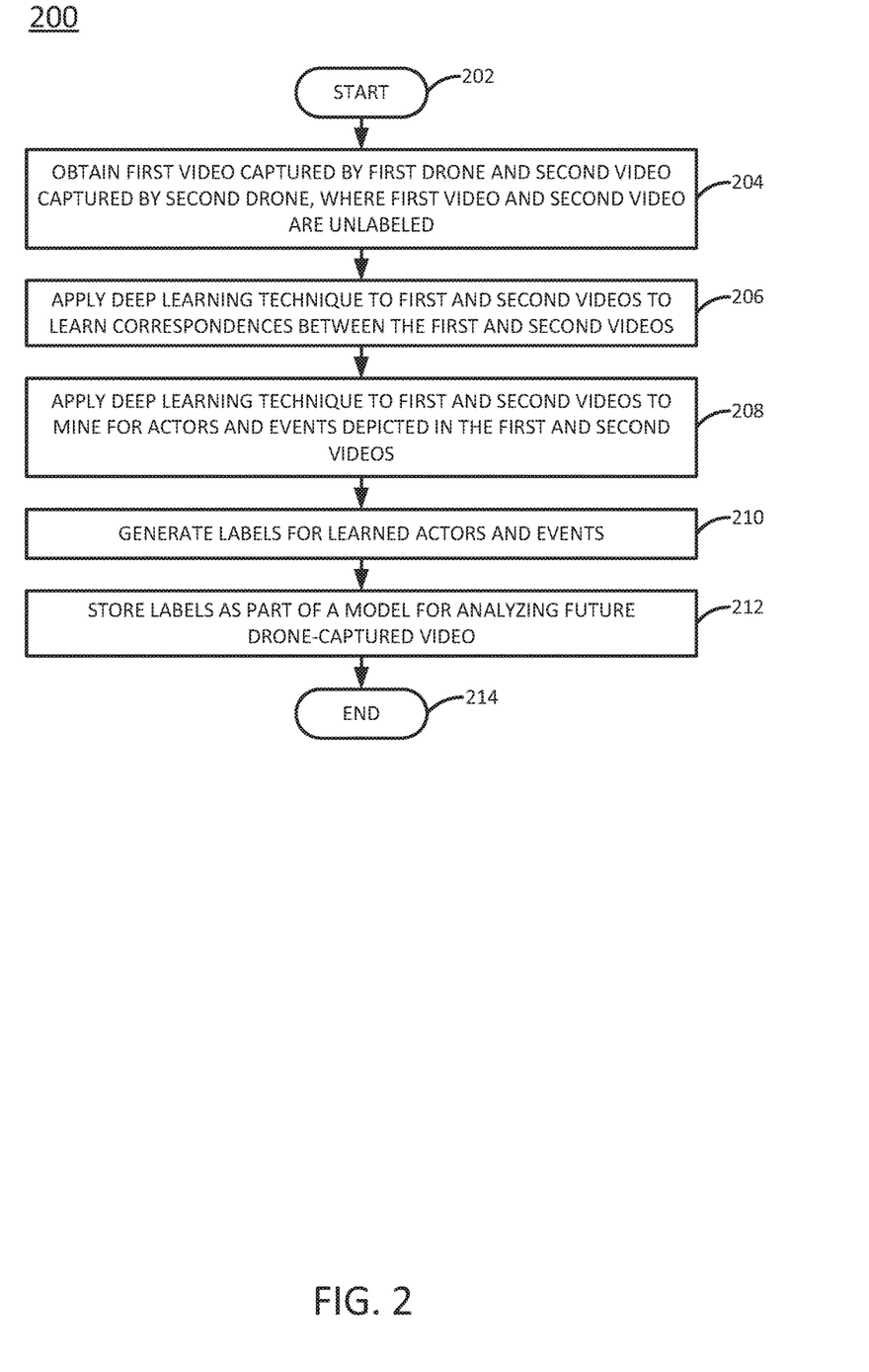
FIG. 2 illustrates a flowchart of an example method for training a system to detect an event in a scene monitored by a plurality of drones.

To further aid in understanding the present disclosure, FIG. 2 illustrates a flowchart of an example method 200 for training a system to detect an event in a scene monitored by a plurality of drones. In one example, the method 200 may be performed by an application server that subscribes to the output of one or more drones, e.g., AS 104 illustrated in FIG. 1. However, in other examples, the method 200 may be performed by another device. For instance, a UE 108, 110, 112, or 114 that is in communication with a drone, or even a UE that is a drone could also perform all or some steps of the method 200. As such, any references in the discussion of the method 200 to the AS 104 of FIG. 1 are not intended to limit the means by which the method 200 may be performed.

The method 200 begins in step 202. In step 204, the AS 104 obtains a set of training data. In one example, the training data comprises a collection of videos recorded by drones, e.g., at least a first video captured by a first drone and a second video captured by a second drone. The first video and the second video are unlabeled, e.g., do not explicitly identify targets or items of interest depicted in the videos. The first video and the second video depict a scene (e.g., an outdoor area, inside a building, etc.) from a first field of view and a second field of view, respectively. The scopes of the first field of view and the second field of view may range anywhere from the ground plane to the air. In one example, the coordinates (e.g., x, y, and z coordinates) of the first drone and the second drone are known for the lengths of the respective videos.

The first video and the second video depict actors (e.g., humans, cars, objects, and the like) involved in activities (e.g., walking, running, group patterns, etc.) in the scene. The first field of view and the second field of view may overlap, so that some actors that are visible in the first video are also visible in the second video, albeit potentially from a different perspective. For instance, the first field of view may present a view of a vehicle from the front, while the second field of view may present a view of the same vehicle from above. The training data may be stored, for example in the DB 106, and retrieved by the AS 104 for training.

In step 206, the AS 104 applies a deep learning technique to the first video and the second video in order to learn (e.g., via machine learning and/or a convolutional neural network) correspondences across the first video and the second video. That is, the deep learning technique may help the AS 104 to identify when the same actor (e.g., the same person or vehicle) is depicted in the first video and the second video. Correspondences may be established from the coordinates of the first and second drones, which may be compared to verify when an actor depicted in the first video and the second video is, in fact, the same object. The deep learning technique is unsupervised; that is, the learning does not rely on labels or other types of human supervision that identify actors or events in the first video and the second video, and the technique is not instructed to look for any particular actors or events. The deep learning technique simply looks for commonalities in the first video and the second video.

In step 208, the AS 104 applies the deep learning technique to mine the first video and the second video for actors (e.g., people, vehicles, objects, buildings, etc.) and events (e.g., crowd activities, anomalous movements, walking, running, playing, etc.) that occur in the scene being monitored. In other words, the AS 104 identifies the features in the first video and the second video that best define a baseline (e.g., a set of actors and events that are expected or considered to be typical) for the scene. As in step 206, the deep learning technique is unsupervised in step 208.

In step 210, the AS 104 generates labels for the learned actors and events. These labels may help the AS 104 to detect when the same actors and events occur in future drone-captured videos of the scene.

In step 212, the AS 104 stores the labels as part of a model that can be used to analyze future drone-captured videos of the scene for actors and events of interest (e.g., anomalies). Learning correspondences between actors (e.g., as in step 206) and identifying actors and events in the scene (e.g., as in step 208) will help the AS 104 to establish a baseline for the scene, as discussed above, which in turn will help to establish which actors and events may be considered anomalous or worthy of further analysis. The model can also be used to determine when the information captured by a drone is insufficient to determine the significance of an actor or event, e.g., when video from other drones should be sought for additional views of the actor or event. The model may be stored, for example in the DB 106 or in another local or remote location. The model can be updated at any time by repeating steps of the method 200, e.g., as additional drone-captured videos of the scene become available.

The method 200 ends in step 214.

Figure 3:
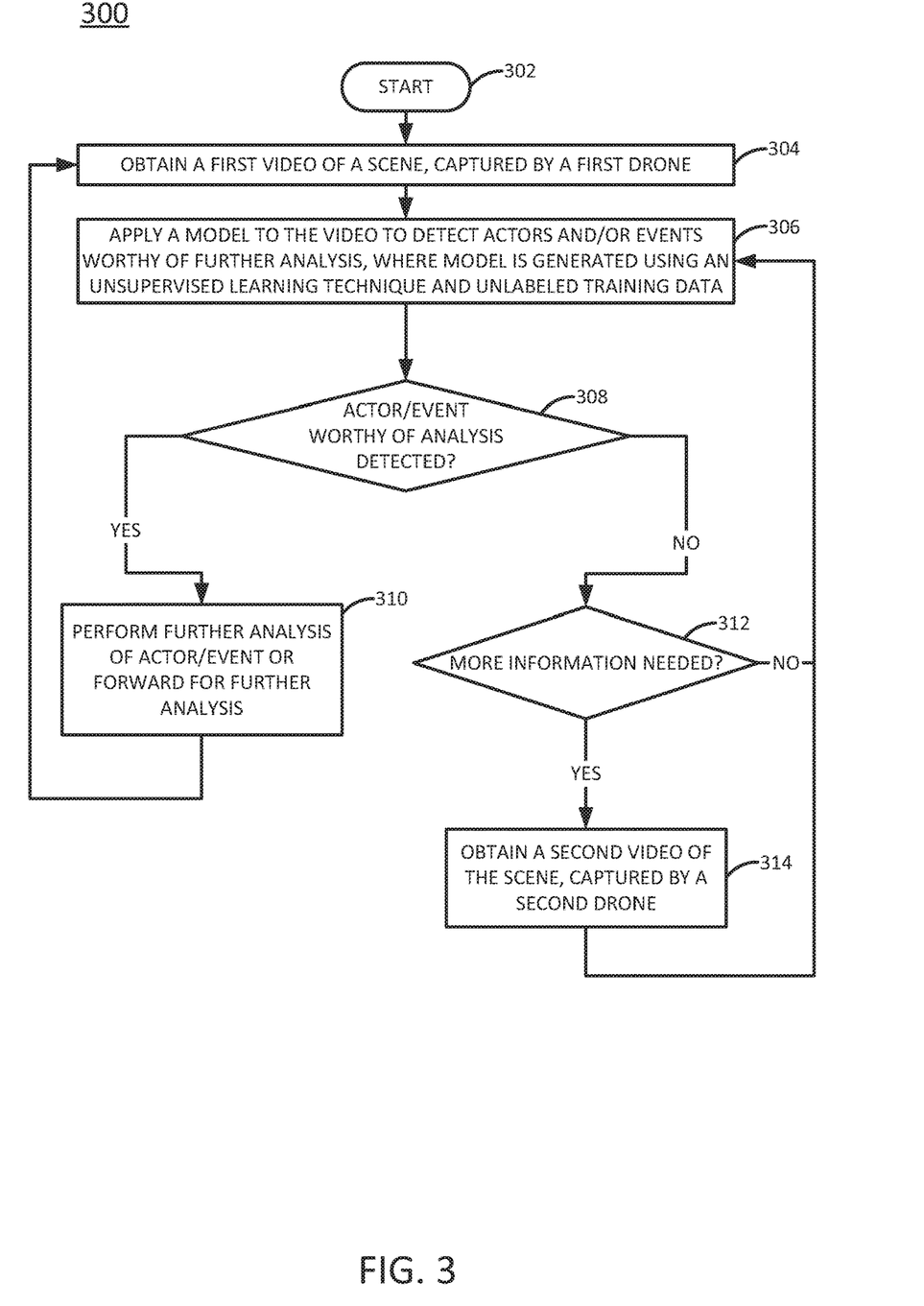
FIG. 3 illustrates a flowchart of an example method for detecting an object or event in a video of a scene that is captured by a drone.

FIG. 3 illustrates a flowchart of an example method 300 for detecting an object or event in a video of a scene that is captured by a drone. In one example, the method 300 may be performed by an application server that subscribes to the output of one or more drones, e.g., AS 104 illustrated in FIG. 1. However, in other examples, the method 300 may be performed by another device. For instance, a UE 108, 110, 112, or 114 that is in communication with a drone, or even a UE that is a drone could also perform all or some steps of the method 200. As such, any references in the discussion of the method 300 to the AS 104 of FIG. 1 are not intended to limit the means by which the method 300 may be performed.

The method 300 begins in step 302. In step 304, the AS 104 obtains a first video of a scene that is captured by a first drone. The first drone may be monitoring the scene, and the first video may depict the scene from a first field of view. The first video may be obtained directly from the first drone in real time (e.g., streaming from the first drone as the frames of the first video are captured, subject to any network delay, buffering, or the like).

In step 306, the AS 104 applies a model to the video to determine whether there are any actors or events occurring in the scene that are worth further analysis. For instance, the model may include labels that identify actors and events that are typical or expected for the scene, as well as actors and events that are considered anomalous for the scene. In one example, the model is generated using an unsupervised learning technique and unlabeled training data (e.g., drone-captured videos), as discussed in connection with FIG. 2.

In step 308, the AS 104 determines whether it is likely that an actor or event worthy of further analysis has been detected in the video. For example, the AS 104 may determine whether an actor or event detected in the video differs from a modeled actor or event (e.g., a typical or expected actor or event) by more than a predefined threshold. Alternatively, the AS 104 may determine whether an actor or event detected in the video is similar enough (e.g., exhibits more than a predefined threshold similarity) to a modeled actor or event (e.g., an anomalous actor or event). In either case, the predefined threshold may be adjustable.

If the AS 104 concludes in step 308 that an actor or event worthy of further analysis has been detected in the video, then the method 300 proceeds to step 310. In step 310, the AS 104 either forwards the video (e.g., to another application server) for further analysis (e.g., facial recognition, pedestrian detection, vehicle identification, activity analysis, and/or crowd pattern analysis) or performs the further analysis itself. The AS 104 then returns to step 304 and continues to obtain new video captured by the first drone.

If, however, the AS 104 concludes in step 308 that an actor or event worthy of further analysis has not been detected in the video, then the AS 104 proceeds to step 312. In step 312, the AS 104 determines whether more information is needed, e.g., whether the video provides sufficient information to determine the significance of an actor or event. This determination may be made using the model (e.g., by determining whether a threshold number of actors or events in the video can be identified using the model).

If the AS 104 concludes in step 312 that no more information is needed, then the method 300 may return to step 306 and proceed as described above to apply the model to newly received frames of the first video.

If, however, the AS 104 concludes in step 312 that more information is needed, then the method 300 proceeds to step

314. In step 314, the AS 104 obtains a second video of the scene that is captured by a second drone, different from the first drone. The second drone may be monitoring the scene, and the second video may depict the scene from a second field of view. The second video may be obtained directly from the second drone in real time (e.g., streaming from the second drone as the frames of the second video are captured, subject to any network delay, buffering, or the like).

The method 300 then returns to step 306 and proceeds as described above to apply the model to the frames of the second video.

Although not expressly specified above, one or more steps of the method 200 or the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 or the method 300 may be implemented as the system 400. For instance, a mobile device or an application server could be implemented as illustrated in FIG. 4.

As depicted in FIG. 4, the system 400 comprises a hardware processor element 402, a memory 404, a module 405 for performing event monitoring using video captured via a plurality of drones, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for performing event monitoring may include circuitry and/or logic for performing special purpose functions relating to monitoring, analyzing, and providing feedback relating to a drone's current field of view and potentially analysis-worthy objects and events detected therein. The input/output devices 406 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a neurotransmitter, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for performing event monitoring (e.g., a software program comprising computer-executable instructions) can be loaded into memory 404 and executed by hardware processor element 402 to implement the steps, functions or operations as discussed above in connection with the example method 200 or the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for inferring the presence of an occluded entity in a video captured via drone (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
   obtaining a first video that is captured by a first drone monitoring a first field of view of a scene, wherein the first video is unlabeled;
   obtaining a second video that is captured by a second drone monitoring a second field of view of the scene, wherein the second video is unlabeled;
   applying an unsupervised deep learning technique to the first video and the second video to:
   learn a correspondence across the first video and the second video; and learn at least one actor from the correspondence across the first video and the second video;

generating a label that identifies each actor of the least one actor;

generating a model of the scene that is based on the correspondence and the at least one actor, wherein the model identifies a baseline for the scene; and storing the model and the label as part of the model.

2. The method of claim 1, wherein the correspondence is verified using coordinates of the first drone and coordinates of the second drone.

3. The method of claim 1, wherein the deep unsupervised learning technique utilizes a convolutional neural network.

4. The method of claim 1, wherein the baseline comprises a set of actors and events that are expected to occur in the scene.

5. The method of claim 1, further comprising:
obtaining a first new video depicting the scene, wherein the first new video is captured by the first drone; and
determining, in accordance with the model, an actor depicted in the first new video requires further analysis.

6. The method of claim 5, wherein the further analysis comprises facial recognition.

7. The method of claim 5, wherein the further analysis comprises vehicle detection.

8. The method of claim 5, wherein the further analysis comprises activity analysis.

9. The method of claim 5, wherein the further analysis comprises crowd pattern analysis.

10. The method of claim 5, further comprising:
determining, in accordance with the model, additional information about the scene is needed to make a conclusion about the actor depicted in the first new video.

11. The method of claim 10, further comprising:
obtaining a second new video depicting the scene, wherein the second new video is captured by the second drone, and wherein the second new video depicts the actor depicted in the first new video.

12. The method of claim 10, wherein the determining, in accordance with the model, additional information about the scene is needed to make the conclusion about the actor depicted in the first new video is in response to determining that a predetermine threshold number of actors in the model are identified in the first new video.

13. The method of claim 5, wherein the first new video is obtained in real time as the first drone captures frames of the first new video.

14. The method of claim 5, wherein the determining, in accordance with the model, the actor depicted in the first new video requires further analysis is in response to determining the actor depicted in the first new video differs from at least one labeled actor in the model by more than a predefined threshold.

15. The method of claim 5, wherein the determining, in accordance with the model, the actor depicted in the first new video requires further analysis is in response to determining the actor depicted in the first new video lacks a predefined threshold of similarity with at least one labeled actor in the model.

16. The method of claim 1, further comprising:
repeating the obtaining the first video, the obtaining the second video, the applying, and the generating the label in order to update the model.

17. The method of claim 1, wherein the first field of view and the second field of view overlap.

18. The method of claim 1, wherein the obtaining the first video, the obtaining the second video, the applying, the generating the label, the generating the model, and the storing is performed by an application server that is coupled to each of the first drone and the second drone through a network.

19. A device, comprising:
a processor; and
a computer-readable medium storing instructions which, when executed by the processor, cause the processor to perform operations comprising:
obtaining a first video that is captured by a first drone monitoring a first field of view of a scene, wherein the first video is unlabeled;
obtaining a second video that is captured by a second drone monitoring a second field of view of the scene, wherein the second video is unlabeled;
applying an unsupervised deep learning technique to the first video and the second video to:
learn a correspondence across the first video and the second video; and
learn at least one actor from the correspondence across the first video and the second video;
generating a label that identifies each actor of the least one actor;
generating a model of the scene that is based on the correspondence and the at least one actor, wherein the model identifies a baseline for the scene; and
storing the model and the label as part of the model.

20. A non-transitory computer-readable storage medium storing instructions which, when executed by a processor, cause the processor to perform operations, the operations comprising:
obtaining a first video that is captured by a first drone monitoring a first field of view of a scene, wherein the first video is unlabeled;
obtaining a second video that is captured by a second drone monitoring a second field of view of the scene, wherein the second video is unlabeled;
applying an unsupervised deep learning technique to the first video and the second video to:
learn a correspondence across the first video and the second video; and
learn at least one actor from the correspondence across the first video and the second video;
generating a label that identifies each actor of the least one actor;
generating a model of the scene that is based on the correspondence and the at least one actor, wherein the model identifies a baseline for the scene; and
storing the model and the label as part of the model.

\* \* \* \* \*